United States Patent
Schrum, Jr.

(10) Patent No.: US 8,130,958 B2
(45) Date of Patent: Mar. 6, 2012

(54) TRANSMIT POWER CONTROL FOR WIRELESS SECURITY

(75) Inventor: Sidney Brower Schrum, Jr., Allen, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1275 days.

(21) Appl. No.: 11/226,685

(22) Filed: Sep. 14, 2005

(65) Prior Publication Data
US 2006/0056636 A1 Mar. 16, 2006

Related U.S. Application Data

(60) Provisional application No. 60/609,622, filed on Sep. 14, 2004.

(51) Int. Cl.
*H04K 1/00* (2006.01)

(52) U.S. Cl. ....... 380/270; 380/278; 713/171; 455/41.1; 455/41.2; 455/69; 455/522; 726/2; 375/133; 375/141; 370/310

(58) Field of Classification Search ............ 380/270, 380/278; 726/2; 713/171; 455/41.1; 375/133; 375/141; 370/310
See application file for complete search history.

(56) References Cited

U.S. PATENT DOCUMENTS

| | | | | |
|---|---|---|---|---|
| 6,026,165 A * | 2/2000 | Marino et al. | ................ | 380/273 |
| 6,148,205 A * | 11/2000 | Cotton | ................... | 455/435.1 |
| 6,714,778 B2 * | 3/2004 | Nykanen et al. | ............ | 455/414.1 |
| 6,928,295 B2 * | 8/2005 | Olson et al. | ................... | 455/522 |
| 7,174,130 B2 * | 2/2007 | Kurisko et al. | ............... | 455/41.2 |
| 7,299,364 B2 * | 11/2007 | Noble et al. | .................. | 713/189 |
| 2002/0115426 A1 * | 8/2002 | Olson et al. | .................. | 455/410 |
| 2003/0050009 A1 * | 3/2003 | Kurisko et al. | ................. | 455/41 |
| 2004/0176071 A1 * | 9/2004 | Gehrmann et al. | ........... | 455/411 |
| 2006/0212270 A1 * | 9/2006 | Shiu et al. | ..................... | 702/188 |

\* cited by examiner

*Primary Examiner* — April Shan
(74) *Attorney, Agent, or Firm* — Sam Talpalatsky; Nicholas J. Pauley; Jonathan T. Velasco

(57) ABSTRACT

The present invention provides a method for establishing a secure channel between wireless devices. The method involves reducing the transmit power of the devices in conjunction with placing the devices in close proximity to one another. By reducing the transmit power, wireless communications between the devices cannot be detected by other devices beyond the short transmission range. The devices then generate and exchange encryption keys using the reduced-power transmissions in order to establish a secure, encrypted communications channel. Once the secure channel is established, the devices increase their transmit power back to normal operating levels, allowing them to be moved further apart while maintaining secure wireless communications.

16 Claims, 3 Drawing Sheets

TRANSMIT POWER CONTROL FOR WIRELESS SECURITY

CROSS-REFERENCE TO RELATED APPLICATIONS

This application claims the benefit of and priority to U.S. Provisional Patent Application No. 60/609,622 filed Sep. 14, 2004 the technical disclosures of which are hereby incorporated herein by reference.

TECHNICAL FIELD

The invention relates generally to wireless communication, and more specifically to security for transmitted signals.

BACKGROUND OF THE INVENTION

Wireless communication systems are especially vulnerable to security-related attacks. Potentially, any device within radio range of a transmitter can intercept transmitted message without being detected by the transmitter or intended recipient(s). Conversely, any device may transmit to any other device that is within range. Therefore, "rogue" devices may mimic legitimate users of the wireless system in order to steal information or services and disrupt the intended use of the communications systems. Security related exposures include but are not limited to theft of information and services and denial of services for legitimate system users.

Cryptography is often used to improve wireless security. Encryption keys known only to legitimate users of the system are used to establish trusted relationships and/or to protect wireless communications. Encryption keys are distributed to legitimate devices using a secure channel. The user may manually enter an encryption key(s) into a device using a keypad or other entry method. Another method involves establishing a temporary wired communications channel for conveying the encryption key(s). Yet another approach uses a portable storage device to transfer encryption key(s) from one device to another.

The manual entry of encryption keys requires a keypad, which increases device costs. It is not practical to integrate a keypad into certain types of devices, such as a computer mouse. In addition, manual entry is error prone and inconvenient to the user.

The use of portable storage devices eliminates human errors from manual entry of encryption keys but increases the cost of devices that otherwise do not require the capability. In addition, the mechanical and physical access requirements associated with providing such capability can be a problem with some wireless devices, e.g. a mechanical connector and insertion slot is required with many types of portable storage devices. Furthermore, while portable storage devices are often more convenient than manual entry, they still require the user to perform several steps correctly and are still subject to human error.

Wired communications increases device cost and can be inconvenient to the user due to the need to configure the devices for the wired connection.

Therefore, it would be desirable to have a method for establishing a secure wireless channel between devices without requiring cryptography.

SUMMARY OF THE INVENTION

In one embodiment, a method is provided for establishing a secure channel between wireless devices. The method involves reducing the transmit power of the devices in conjunction with placing the devices in close proximity to one another. By reducing the transmit power, wireless communications between the devices cannot be detected by other devices beyond the short transmission range. The communication link between the two devices is considered a secure channel when it can be reasonably confirmed that no "rogue" devices are within communication distance, or effective radio range, of the two devices. For example, with the reduced power settings the effective radio range of the wireless communication of the devices may be only slightly greater than the device's physical size. Therefore, if the two devices are within this effective radio range and no other devices are within a reasonable distance, the communication is considered a secure channel.

Any informational data can be communicated over the secure channel. In one embodiment, after establishing a secure channel, the devices then generate and exchange encryption keys over the secure channel. By exchanging the keys over this secure channel, the two devices will have the necessary keys to establish an encrypted session over a standard wireless communication link.

After successfully exchanging the two keys, the "enrollment" process has been completed. Enrollment is the process of exchanging encryption keys between two devices, enabling them to establish an encrypted session. After enrollment, the two devices increase the respective transmission powers to normal operating levels. The increased transmission power increases the effective radio range of the two devices. The two devices may now be separated by a greater distance.

One goal of one embodiment is to establish secure communication between a first device and a second device. Secure communication is any form of communicating between the two devices that enables the two devices to communicate with little or minimal risk of divulging the information in the communication. One possible form of secure communication is an encrypted session. For example, after raising the transmission power the newly acquired encryption keys are used to initiate an encrypted session between the two devices. The encrypted session uses the same type of communication link as described earlier, but the data is encrypted before being transmitted, and only devices with the appropriate encryption keys are able to decrypt and understand the data.

BRIEF DESCRIPTION OF THE DRAWINGS

The novel features believed characteristic of certain embodiments are set forth in the appended claims. The embodiments, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

In one embodiment, a method is provided for establishing a "secure channel" (as referred to as a secure link) over a wireless communications system without requiring cryptography. Once a secure channel is established, the secure channel may then be used to transfer encryption keys to enable secure communications via encryption. This embodiment provides for a cost effective, convenient solution, which avoids the mechanical issues, associated with keypads and portable storage device readers.

The present invention uses the wireless communications capability built into devices, which may be incorporated into these devices exclusively to convey sensitive information. However, in one possible embodiment, wireless capability is integral to normal device functionality, and the invention takes advantage of this capability to establish a secure channel when required.

In one embodiment, a secure channel is established by using reduced transmit power in conjunction with placing the devices in relatively close proximity to one another when the secure channel is in use. Wireless communications systems are designed to be usable over a specific range, which is the maximum distance between communicating devices. The transmit power as measured at the transmitter antenna is a dominant factor affecting maximum range. The transmit power is reduced below the maximum capabilities of the device and wireless system in order to improve security.

Security can be assured with reasonable confidence if the usable range of a wireless communication is contained within an area that is known to be free of suspect or "rogue" devices (i.e. the area within the reduced transmission range is physically secure). The use of reduced power transmission and the proximity requirement are maintained only when the secure channel needs to be established to exchange the encryption keys. Normal transmit power levels and distances between devices can be restored when the secure channel is no longer needed.

Figure 1:
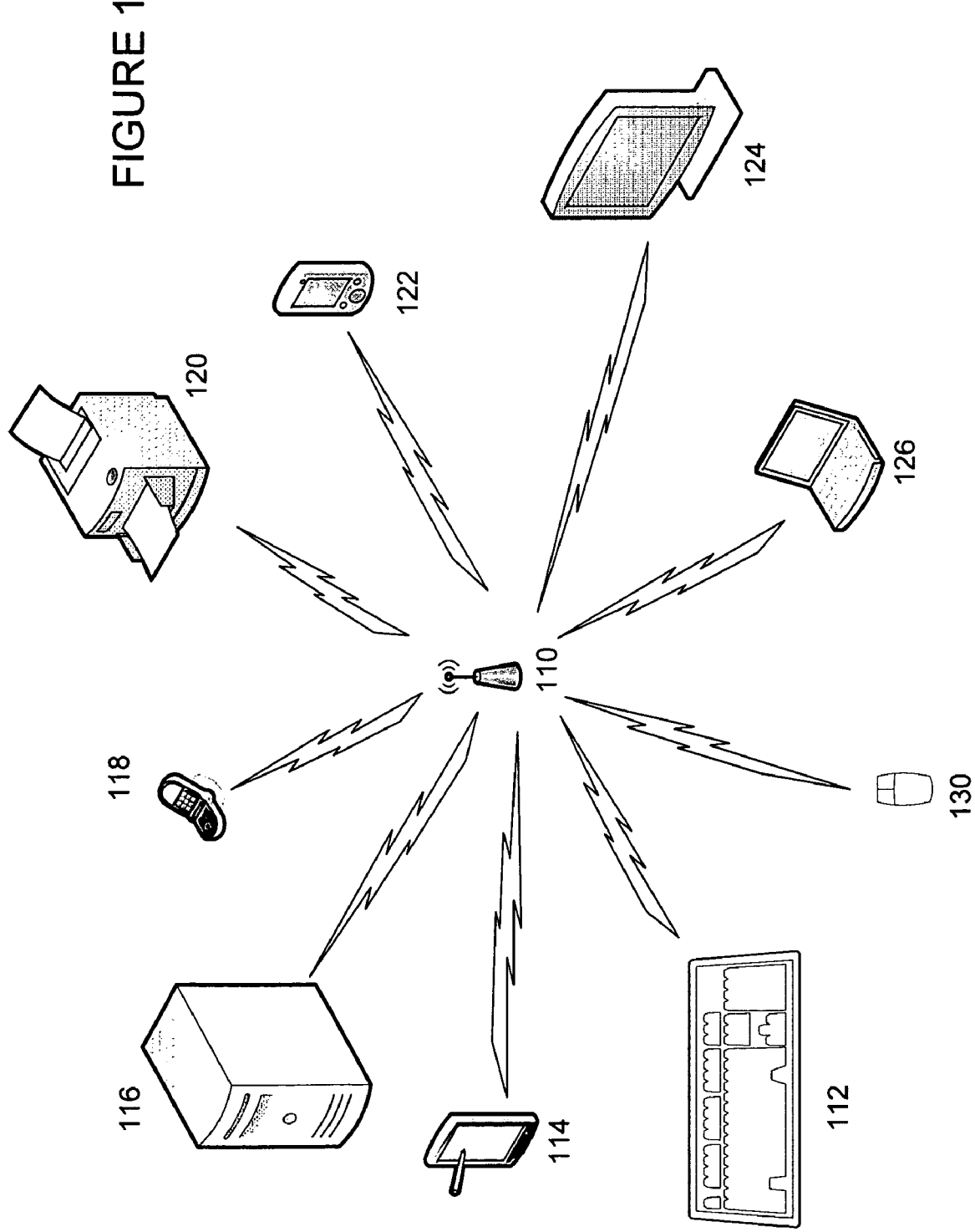
FIG. 1 is a depiction of a plurality of wireless devices that may incorporate embodiments of the present invention.

FIG. 1 is a depiction of several devices capable of utilizing embodiments of the present invention. Wireless devices that may incorporate embodiments of the present invention includes, a wireless access point 110, a keyboard 112, a tablet personal computer 114, a desktop computer 116, a cellular telephone 118, a printer 120, a personal digital assistant 122, a computer display 124, a laptop 126, or a computer mouse 130. However, such a list is not exclusive, and any device capable of wireless communication may utilize embodiments of the present invention.

Figure 2A:
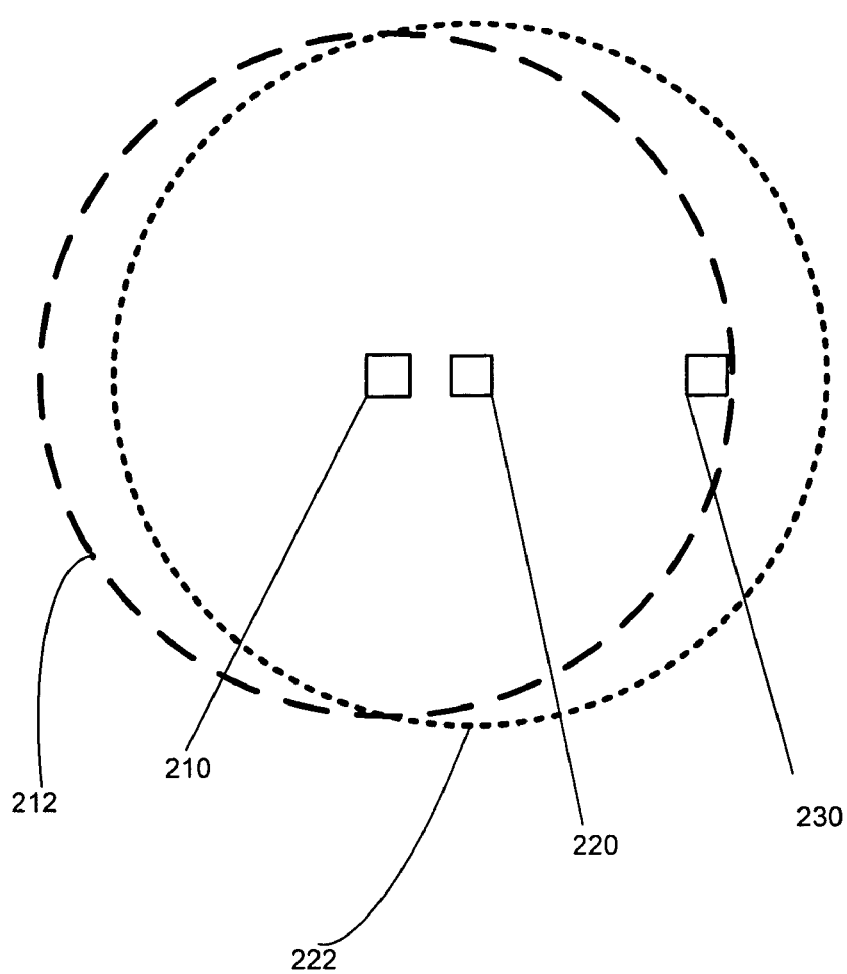
FIG. 2A is a depiction of the normal-power communication ranges between three wireless devices.

FIG. 2A is a graphical depiction of the normal-power communication ranges of three wireless devices. The first device 210 has an effective communication range shown by the circle 212. The real-world communication ranges of the devices are difficult to determine precisely, because many environmental factors play a role in determining the range such as the existence of objects between two devices, antenna design, or interference from other radio devices. The shown communication range is a rough estimate only intended to illustrate the operation of the devices in the context of the present invention. The second device 220 has an effective communication range shown by the circle 222. The spatial relationship between the three devices is important, and it should be noted that the first device 210 and the second device 220 are in close proximity, while the third device 230, a "rogue" or unauthorized device, is at some distance from the first two devices. As shown, the communication ranges of the first and second device encompass all three devices including the "rogue" device 230. This means all three devices are capable of receiving the communications from the first and second device (210 and 220). Exchanging sensitive information, including encryption keys, between the first device 210 and the second device 220 could be intercepted by the "rogue" third device 230.

Figure 2B:
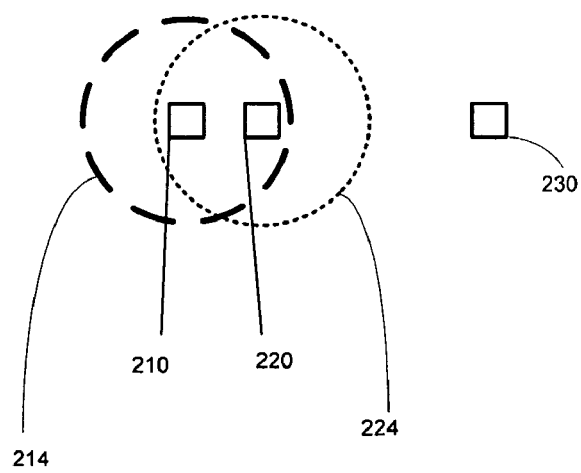
FIG. 2B is a depiction of the low-power communication ranges between three wireless devices.

FIG. 2B is a graphical depiction of the low-power communication range of three wireless devices in the same spatial relationship as shown in FIG. 2A. At low-power the effective communication ranges of the first device 210 and second device 220 are shown by circles 214 and 224. The first device 210 has an effective low-power communication range 214 that encompasses the second device 220, but not the third device 230. The second device 220 has an effective low-power communication range 224 that encompasses the first device 210, but not the third device 230. In one embodiment, if it is known that no "rogue" devices, like device 230, are within the low-power communication ranges of the first and second device (214 and 224) then any communication between the first device 210 and the second device 220 is a "secure channel" in that there is a reasonable confidence that no other devices are capable of intercepting the communication.

Figure 3:
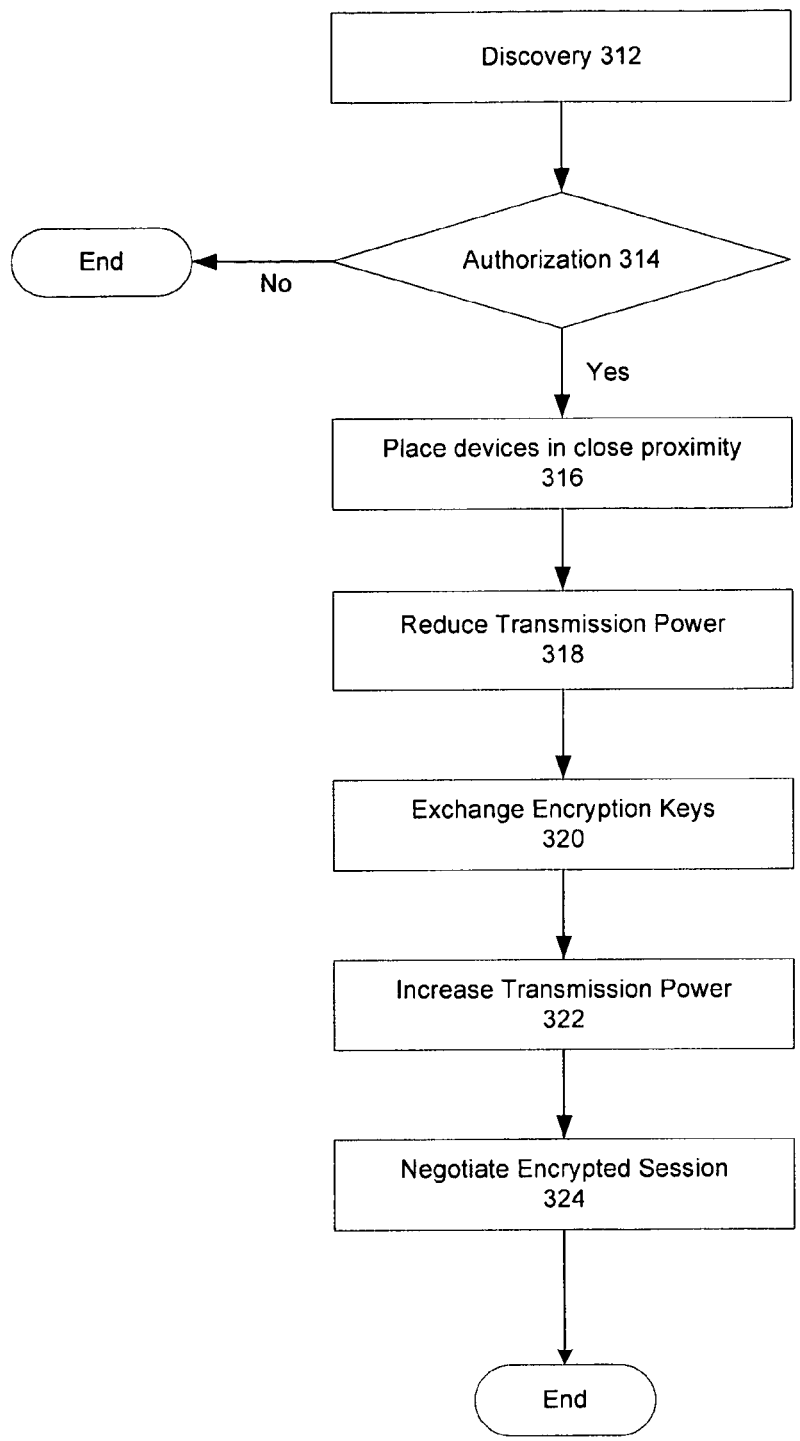
FIG. 3 is a flowchart illustrating the process of establishing a secure channel in accordance with one embodiment of the present invention.

FIG. 3 is a flowchart illustrating the process of establishing encrypted communication in accordance with one embodiment of the present invention. The establishment of a trusted relationship between two devices is called "enrollment". The process begins when two wireless devices come within radio range and discover each other using normal, non-secure transmissions at normal power levels (step 314). Once the devices detect each other, one or both may provide an indication to the user that wireless communication is possible and a request is made for the user to authorize whether or not the enrollment process should proceed (step 316). Authorization may be accomplished by a number of different methods. For example, the user may authorize the communication by pressing a button on one of the devices. In another embodiment, the device may be preauthorized to conduct enrollment with certain devices. In yet another embodiment, both devices may require a button or actuating device be used to authorize the enrollment process. If the user does not want to proceed with enrollment, the process simply ends. If the user does want to proceed with enrollment one or both of the devices instruct the user to place the devices in close proximity to each other and the transmission power levels for the respective devices are reduced to a low-power level (step 318). For Wireless Personal Area Network (WPAN) devices, the two devices are typically located within a few inches of each other. The specific distance depends on the actual low-power transmission level used in a particular embodiment. The low-power transmission level should be determined for each particular application such that only the devices involved in the enrollment process are within the effective communication range of each other. This prevents any rogue devices from intercepting the communication between the two devices. A reference back to FIG. 2B illustrates physical device relationships and the effective communication ranges for low-power transmission levels. If the first device 210 and the second device 220 were engaged in an enrollment process, the third device 230 would not be capable of intercepting the communications between the first device and the second device because the transmission power level of the first and second devices 210 and 220 are insufficient to allow the third device 230 to "eavesdrop." A secure channel has been established between the first device and the second device, meaning their communication cannot be intercepted. After reducing the power of their respective transmissions (step 318), the devices then generate the encryption key(s) required for initiating an encrypted session and exchange, or share, the key(s) using reduced power transmissions (step 320). A nonexhaustive list of encryption keys that may be used with certain embodiments of the present invention are Data Encryption Standard (DES) keys, Advanced Encryption Standard (AES) keys, and a number of other encryption key types.

After the devices confirm successful communication of the encrypted keys, the power levels may be raised back to a normal-power transmission level (step 322). At this point, enrollment has completed, but the communication between the devices is unsecured, in that other devices may be within range to intercept communication, and unencrypted, in that data transmitted across the wireless communication link is not protected by the use of the encryption keys.

After enrollment, the two devices may negotiate, or initiate, an encrypted session (step 324) using the encryption key(s) acquired in the enrollment process. When an encrypted session has been successfully negotiated, the data communicated across the communication link is encrypted so that other devices would be practically incapable of determining the unencrypted data communicated.

Optionally, at any point in the process, the user(s) of the devices may be notified when enrollment is completed and/or that an encrypted session has been negotiated. The normal-power transmission levels allow the user to freely move the devices anywhere within the normal operating distances, illustrated by the operating ranges shown in FIG. 2A.

An alternative embodiment of the present invention may perform mixed level transmissions using the same basic technology. For example, by selectively applying reduced transmit power, i.e. a low transmit power, communication can be over a "mixed-use channel." The mixed-use channel communicates some transmissions at a low transmission power level, like the secured channel described earlier, and some transmissions at a normal transmission power level. The transmission power level is dynamically selected based on whether the data to be transmitted is a secure transmission, i.e. confidential information, or an unsecured transmission, e.g. normal Internet content.

By reducing the range of transmission through reduced power, one embodiment of the invention improves security by reducing the opportunity for unwanted devices to intercept encryption keys and comprise the security of any encrypted session. Embodiments of the present invention may also use secure and non-secure transmissions simultaneously. Selective, dynamic use of reduced power transmissions may be based on the need to secure specific transmission. In this manner, reduced transmit power is applied depending on the target device and the nature of the transmission.

The description of certain embodiments of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. An apparatus for wireless communication, the apparatus comprising:
    a memory; and
    a processor coupled to the memory, wherein the processor is configured to:
        detect a wireless device based, at least in part, on reception of a transmission from the wireless device, the transmission occurring at a normal-power level;
        exchange, in response to at least the detection of the wireless device, one or more encryption keys with the wireless device at a low-power level;
        initiate an encrypted session with the wireless device at the normal-power level using the one or more encryption keys exchanged at the low-power level; and
        communicate with the wireless device in the encrypted session after the initiation is successful, wherein some transmissions in the encrypted session are transmitted at the low-power level and some other transmissions in the encrypted session are transmitted at the normal-power level, wherein power level of each transmission in the encrypted session is selected based on whether data to be transmitted is confidential information.

2. The apparatus of claim 1, wherein the processor is further configured to provide an indication of detection of the wireless device to a user.

3. The apparatus of claim 1, wherein the processor is further configured to prompt, in response to at least the detection of the wireless device, a user for authorization to communicate with the wireless device.

4. The apparatus of claim 3, wherein the processor is further configured to receive an input from a user authorizing communication with the wireless device and wherein exchanging is in response to at least receiving the input.

5. The apparatus of claim 1, wherein the one or more encryption keys are Data Encryption Standard (DES) keys.

6. The apparatus of claim 1, wherein the one or more encryption keys are Advanced Encryption Standard (AES) keys.

7. The apparatus of claim 1, wherein initiating the encrypted session comprises transmitting or receiving an unencrypted message.

8. A method, implemented in an apparatus, for wireless communication, the method comprising:
    detecting a wireless device based, at least in part, on reception of a transmission from the wireless device, the transmission occurring at a normal-power level;
    exchanging, in response to at least the detection of the wireless device, one or more encryption keys with the wireless device at a low-power level;
    initiating an encrypted session with the wireless device at the normal-power level using the one or more encryption keys exchanged at the low-power level; and
    communicate with the wireless device in the encrypted session after the initiation is successful, wherein some transmissions in the encrypted session are transmitted at the low-power level and some other transmissions in the encrypted session are transmitted at the normal-power level, wherein power level of each transmission in the encrypted session is selected based on whether data to be transmitted is confidential information.

9. The method of claim 8, further comprising providing an indication of detection of the wireless device to a user.

10. The method of claim 8, further comprising prompting, in response to at least the detection, a user for authorization to communicate with the wireless device.

11. The method of claim 10, further comprising receiving an input from a user authorizing communication with the wireless device, wherein exchanging is in response to at least receiving the input.

12. The method of claim 8, wherein the one or more encryption keys are Data Encryption Standard (DES) keys.

13. The method of claim 8, wherein the one or more encryption keys are Advanced Encryption Standard (AES) keys.

14. The method of claim 8, wherein initiating the encrypted session comprises transmitting or receiving an unencrypted message.

15. A cellular telephone, the cellular telephone comprising:
   a memory;
   an antenna; and
   a processor coupled to the memory and the antenna, wherein the processor is configured to:
      detect a wireless device based, at least in part, on the reception, via the antenna, of a transmission from the wireless device, the transmission occurring at a normal-power level;
      exchange, via the antenna and in response to at least the detection of the wireless device, one or more encryption keys with the wireless device at a low-power level;
      initiate, via the antenna, an encrypted session with the wireless device at the normal-power level using the one or more encryption keys exchanged at the low-power level; and
      communicate with the wireless device in the encrypted session after the initiation is successful, wherein some transmissions in the encrypted session are transmitted at the low-power level and some other transmissions in the encrypted session are transmitted at the normal-power level, wherein power level of each transmission in the encrypted session is selected based on whether data to be transmitted is confidential information.

16. A non-transitory computer-readable medium having stored thereon, computer executable instructions that, when executed by an apparatus, cause the apparatus to perform a method comprising:
   detecting a wireless device based, at least in part, on reception of a transmission from the wireless device, the transmission occurring at a normal-power level;
   exchanging, in response to at least the detection of the wireless device one or more encryption keys with the wireless device at a low-power level;
   initiating an encrypted session with the wireless device at the normal-power level using the one or more encryption keys exchanged at the low-power level; and
   communicating with the wireless device in the encrypted session after the initiation is successful, wherein some transmissions in the encrypted session are transmitted at the low-power level and some other transmissions in the encrypted session are transmitted at the normal-power level, wherein power level of each transmission in the encrypted session is selected based on whether data to be transmitted is confidential information.

\* \* \* \* \*